US010942602B1

(12) United States Patent
Ponnarasu et al.

(10) Patent No.: US 10,942,602 B1
(45) Date of Patent: Mar. 9, 2021

(54) ELECTRONIC DEVICE WITH FINGER TOUCH DETECTION AND RELATED METHODS

(71) Applicant: STMicroelectronics Asia Pacific Pte Ltd., Singapore (SG)

(72) Inventors: Manivannan Ponnarasu, Erode (IN); Ade Putra, Singapore (SG)

(73) Assignee: STMICROELECTRONICS ASIA PACIFIC PTE LTD., Singapore (SG)

( * ) Notice: Subject to any disclaimer, the term of this patent is extended or adjusted under 35 U.S.C. 154(b) by 0 days.

(21) Appl. No.: 16/669,169

(22) Filed: Oct. 30, 2019

(51) Int. Cl.
*G06F 3/041* (2006.01)
*G06F 3/044* (2006.01)

(52) U.S. Cl.
CPC ...... *G06F 3/041662* (2019.05); *G06F 3/0446* (2019.05); *G06F 3/04186* (2019.05); *G06F 2203/04104* (2013.01)

(58) Field of Classification Search
CPC .............. G06F 3/041; G06F 3/041662; G06F 3/04186; G06F 3/0446; G06F 3/044; G06F 2203/04106
See application file for complete search history.

(56) References Cited

U.S. PATENT DOCUMENTS

| 7,489,306 | B2 | 2/2009 | Kolmykov-Zotov et al. |
| 7,864,161 | B2 | 1/2011 | Hollemans et al. |
| 8,803,844 | B1 | 8/2014 | Green et al. |
| 9,041,654 | B2 | 5/2015 | Ellard |
| 9,075,462 | B2 | 7/2015 | Sauer et al. |
| 9,189,597 | B2 | 11/2015 | Bluemler et al. |
| 9,323,398 | B2 * | 4/2016 | Bernstein ................ G06F 3/044 |
| 9,798,428 | B2 * | 10/2017 | Dai .......................... G06F 3/044 |

(Continued)

FOREIGN PATENT DOCUMENTS

| CN | 201765597 U | 3/2011 |
| WO | 2012019350 A1 | 2/2012 |
| WO | 2013106300 A1 | 7/2013 |

OTHER PUBLICATIONS

Barrett, Gary et al., "Projected-Capacitive Touch Technology," Frontline Technology, Information Display 3/10, Mar. 2010, 6 pages.

(Continued)

*Primary Examiner* — Sardis F Azongha
(74) *Attorney, Agent, or Firm* — Slater Matsil, LLP

(57) ABSTRACT

In one embodiment, a method for operating an electronic device includes determining that a touch sensitive display is being contacted. The touch sensitive display includes a plurality of mutual-sensing capacitive sensor regions and an array of self-sensing capacitive sensor regions. The plurality of mutual-sensing capacitive sensor regions is arranged in rows and columns on the touch sensitive display. The array of self-sensing capacitive sensor regions is arranged in a row or a column on the touch sensitive display. The method may include obtaining mutual sensing touch values for each of the rows and the columns and self-sensing touch values for the row or the column. Based on the mutual sensing touch values and self-sensing touch values, the method includes determining whether a contacted region of the touch sensitive display is an impression of a single finger, multiple fingers, a single thumb, or multiple thumbs.

23 Claims, 11 Drawing Sheets

(56) References Cited

U.S. PATENT DOCUMENTS

| | | | |
|---|---|---|---|
| 9,864,468 B2* | 1/2018 | Kim | G06F 3/0418 |
| 10,365,764 B2* | 7/2019 | Korapati | G06F 3/0446 |
| 2006/0097991 A1 | 5/2006 | Hotelling et al. | |
| 2011/0084927 A1 | 4/2011 | Chang et al. | |
| 2011/0084928 A1 | 4/2011 | Chang et al. | |
| 2012/0044150 A1 | 2/2012 | Karpin et al. | |
| 2013/0076644 A1* | 3/2013 | Escobedo | G06F 3/0418 345/173 |
| 2014/0192027 A1 | 7/2014 | Ksondzyk et al. | |
| 2014/0204058 A1* | 7/2014 | Huang | G06F 3/04182 345/174 |
| 2015/0049043 A1* | 2/2015 | Yousefpor | G06F 3/044 345/174 |
| 2015/0261348 A1* | 9/2015 | Jang | G06F 3/0416 345/174 |
| 2017/0038883 A1* | 2/2017 | Nagarajan | G06F 3/044 |
| 2019/0050079 A1* | 2/2019 | Wang | G06F 3/0443 |
| 2019/0056834 A1* | 2/2019 | Blondin | G06F 3/04164 |
| 2019/0250731 A1* | 8/2019 | Ponnarasu | G06F 3/04186 |

OTHER PUBLICATIONS

Kyoung, Kyuwon et al., "Electromagnetic Field Analysis of Capacitive Touch Panels," Journal of Information Display, ISSN: 1598-0316, http://www.tandfonline.com/loi/tjid20, Taylor & Francis Group, Sep. 5, 2014, 12 pages.

Pushek Madaan et al, "Capacitive Sensing Made Easy, Part 1: An Introduction to Different Capacitive Sensing Technologies," Cypress Perform, Apr. 2012, 8 pages.

Ye, Zhi et al., "High Precision Active-Matrix Self-Capacitive Touch Panel Based on Fluorinated ZnO Thin-Film Transistor," IEEE Journal of Display Technology, vol. 11, Issue 1, Jan. 2015, pp. 22.29.

* cited by examiner

Figure 3

ELECTRONIC DEVICE WITH FINGER TOUCH DETECTION AND RELATED METHODS

TECHNICAL FIELD

The present invention relates generally to electronic devices that utilize touch screen technology, and, in particular embodiments, to an electronic device with finger touch detection and related methods.

BACKGROUND

Electronic devices that are designed for user interaction have historically utilized external input devices, such as keyboards, keypads, and/or mice to capture user input. In recent years, there has been a push from the more traditional methods, as consumers prefer the convenience of portable devices that can support a more mobile lifestyle. To this end, there has been a rise in smaller, portable, hand-held electronic devices, such as mobile phones, tablets, gaming systems, etc. This has given rise to the popularity of touch screens and touch panel displays as systems for capturing user input. Not only do they provide the functionality of the traditional electronic devices, but touchscreens can provide additional features. For example, given the appropriate software, users are able to utilize touchscreens for sketching, drawing, and various handwriting applications.

Commonly, there are various types of touchscreens for receiving user input. One of which being capacitive touchscreens. In capacitive touchscreens, arrays of vertical and horizontal electrodes are placed on top of each other so as to form a matrix of capacitors. When a user provides input through the touch of a finger, the location of their touch is registered as a capacitance value of an electrode at the exact touch location. The amount of capacitance change allows the touch location to be identified.

SUMMARY

In accordance with an embodiment of the present invention, a method for operating an electronic device comprises determining that a touch sensitive display is being contacted. The touch sensitive display comprises a plurality of mutual-sensing capacitive sensor regions and an array of self-sensing capacitive sensor regions. The plurality of mutual-sensing capacitive sensor regions is arranged in rows and columns on the touch sensitive display. The array of self-sensing capacitive sensor regions is arranged in a row or a column on the touch sensitive display. The method may include reading mutual sensing data measured by the plurality of mutual-sensing capacitive sensor regions to obtain mutual sensing touch values for each of the rows and the columns. The method also includes reading self-sensing data measured by the array of self-sensing capacitive sensor regions to obtain self-sensing touch values for the row or the column. Based on the mutual sensing touch values and self-sensing touch values, the method includes determining whether a contacted region of the touch sensitive display is an impression of a single finger, multiple fingers, a single thumb, or multiple thumbs.

In accordance with an embodiment of the invention, a method for operating an electronic device, the method comprises determining that a touch sensitive display is being contacted. The touch sensitive display comprises a plurality of sensor regions and an array of self-sensing capacitive sensor regions. The plurality of sensor regions is arranged in rows and columns on the touch sensitive display. The array of self-sensing capacitive sensor regions is arranged in a row or a column on the touch sensitive display. The method further includes reading mutual sensing data to obtain mutual sensing touch values for each of the plurality of sensor regions. The method may further include based on the mutual sensing touch values, identifying a subset of the plurality of sensor regions comprising contiguous sensor regions. Each of the contiguous sensor regions of the subset has a mutual sensing touch value higher than a first threshold value. The method may further include determining whether any of the sensor regions of the subset have a mutual sensing touch value less than the first threshold value and greater than a second threshold value. The method may further include identifying a first region when it is determined that the subset includes one sensor region having a mutual sensing touch value less than the first threshold value and greater than the second threshold value, and the one sensor region is enclosed within the remaining ones of the subset of the plurality of sensor regions. In response to identifying the first region, the method may include reading self-sensing data to obtain self-sensing touch values, determining whether the self-sensing data comprises a plurality of self-sense blocks, dividing the first region into a plurality of second regions in response to determining that the self-sensing data comprises the plurality of self-sense blocks, wherein each of the plurality of second regions corresponds to one of the plurality of self-sense blocks. For each of the plurality of second regions, the method may include determining whether it comprises a volcanic crater profile that is indicative of an impression of a thumb.

In accordance with an embodiment of the invention, an electronic device comprises a touch sensitive display comprising a plurality of capacitive sensor regions. The plurality of capacitive sensor regions is arranged in rows and columns on the touch sensitive display. The plurality of capacitive sensor regions is configured to measure mutual capacitance and generate mutual sensing touch values for each row and column and measure self-sensing capacitance and generate self-sensing touch values for each row or column. The electronic device comprises a processor, and a memory storing a program to be executed in the processor. The program comprises instructions for determining that the touch sensitive display is being contacted, reading the mutual sensing touch values for each row and column, reading the self-sensing touch values for each row or each column. Based on the mutual sensing touch values and self-sensing touch values, the program may comprise instructions for determining whether a contacted region of the touch sensitive display is an impression of a single finger, multiple fingers, a single thumb, or multiple thumbs.

BRIEF DESCRIPTION OF THE DRAWINGS

For a more complete understanding of the present invention, and the advantages thereof, reference is now made to the following descriptions taken in conjunction with the accompanying drawings, in which:

FIGS. 1A-C illustrate an electronic device having a touch sensitive display that is configured to detect and differentiate various types of contact in accordance with an embodiment of the invention, wherein FIG. 1A illustrates a front view of the electronic device, FIG. 1B illustrates a component schematic of the electronic device, and FIG. 1C illustrates a functional schematic of the electronic device;

FIGS. 2A-C illustrates exemplary raw touch data detected by an electronic device, wherein FIG. 2A illustrates an exemplary electronic readout of raw touch data, wherein FIG. 2B represents a first exemplary raw touch data 107a obtained under well-grounded conditions, and wherein FIG. 2C represents a second exemplary raw touch data 107b obtained under poorly-grounded conditions;

FIG. 3 illustrates an exemplary electronic readout of raw touch data detected by an electronic device that includes both mutual sensing data and self-sensing data showing formation of touch patterns in accordance with an embodiment of the present invention;

Figure 1A:
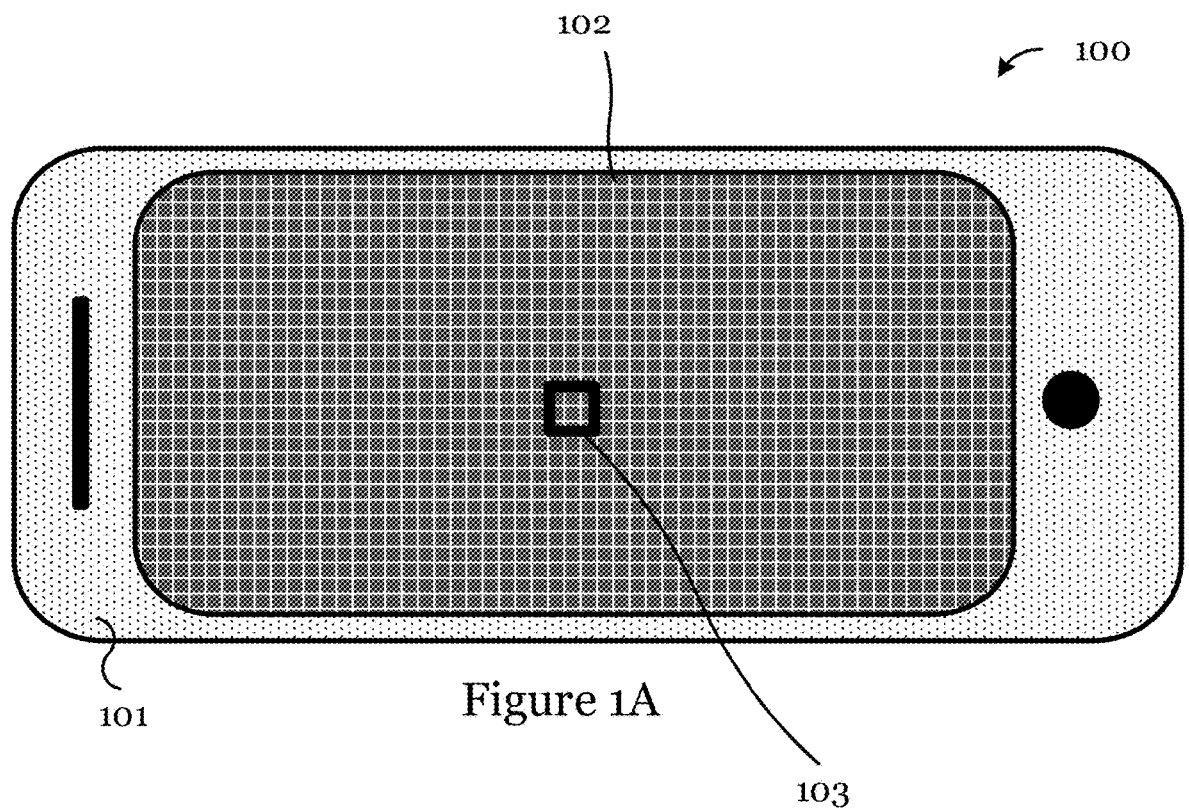

The drawings are not necessarily drawn to scale. The drawings are merely representations, not intended to portray specific parameters of the invention. The drawings are intended to depict only specific embodiments of the inventions, and therefore should not be considered as limiting in scope. In the drawings, like numbering represents like elements.

DETAILED DESCRIPTION OF ILLUSTRATIVE EMBODIMENTS

The structure, method, and using of various embodiments of an electronic device are discussed in detail below. However, it should be valued that the various embodiments detailed herein may be applicable in a wide variety of disciplines. The specific embodiments described herein are merely illustrative of specific ways to make and use various embodiments, and should not be construed in a limited scope.

While touchscreens have led to great advances in the evolution of portable electronic devices, due to their delicate nature there are still limitations that exist. Namely, touchscreens may not judge or register user input correctly, thus causing incorrect operations to be performed. Errors registering input may also cause the system to become unresponsive. Likewise, when electronic devices are operated under poorly grounded conditions (i.e., not plugged into a USB port and/or operated while resting on a surface), this can lead to improper touch separation, touch breaks, ghost touches, or false touch merging.

Embodiments of the present invention relate to an electronic device that can reliably detect and accurately report multi-finger input from touchscreens while operating in poorly grounded conditions. Various embodiments of the present invention disclose a device and a method for reliably detecting and avoiding false merging of multi-touch input during poor return conditions.

Figure 4A:
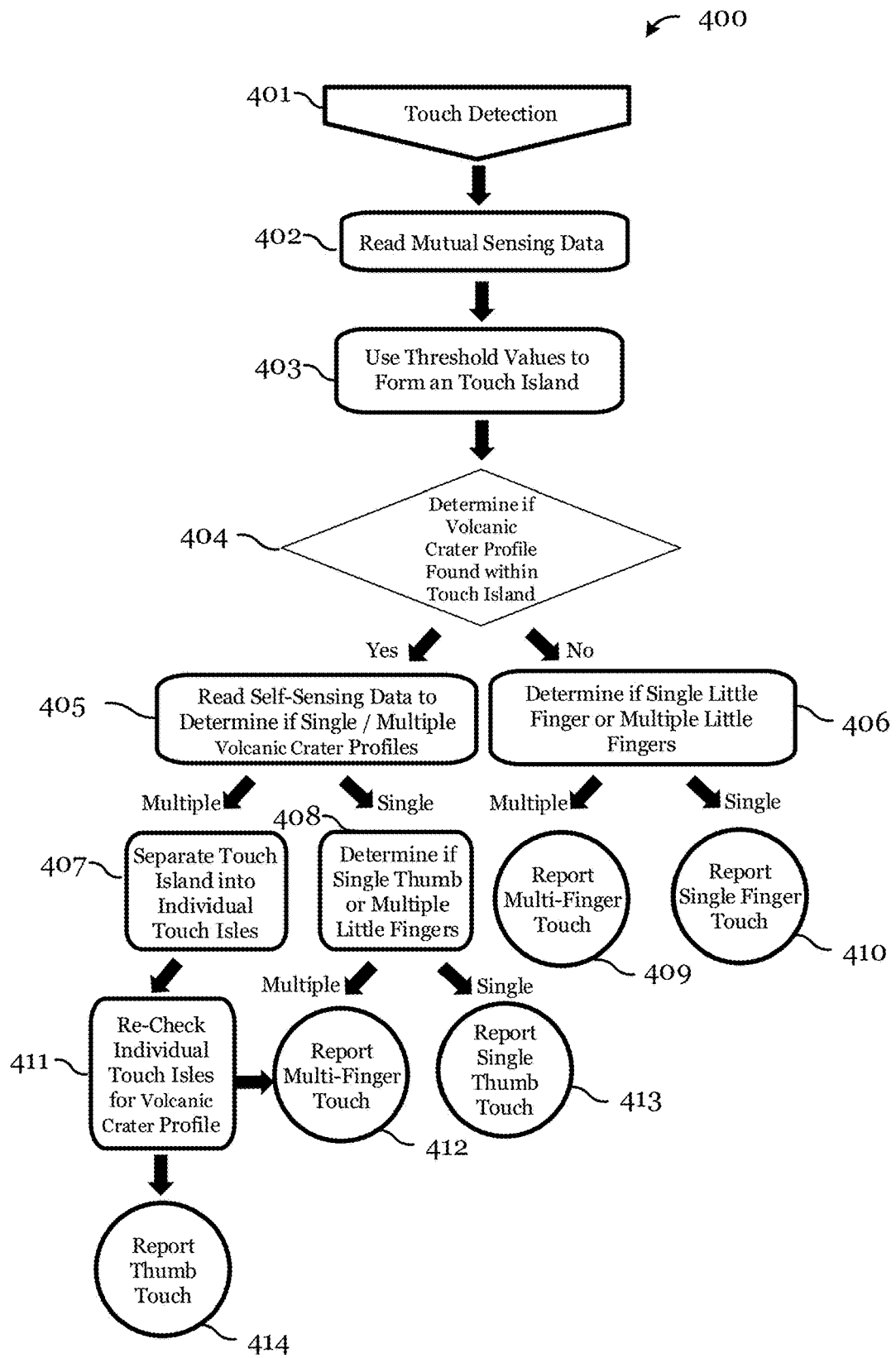
FIG. 4A illustrates a process flow, as performed at the touch detector of FIG. 1C, to determine touch information based on mutual sensing data and self-sensing data in accordance with an embodiment of the present invention.
Figure 4B:
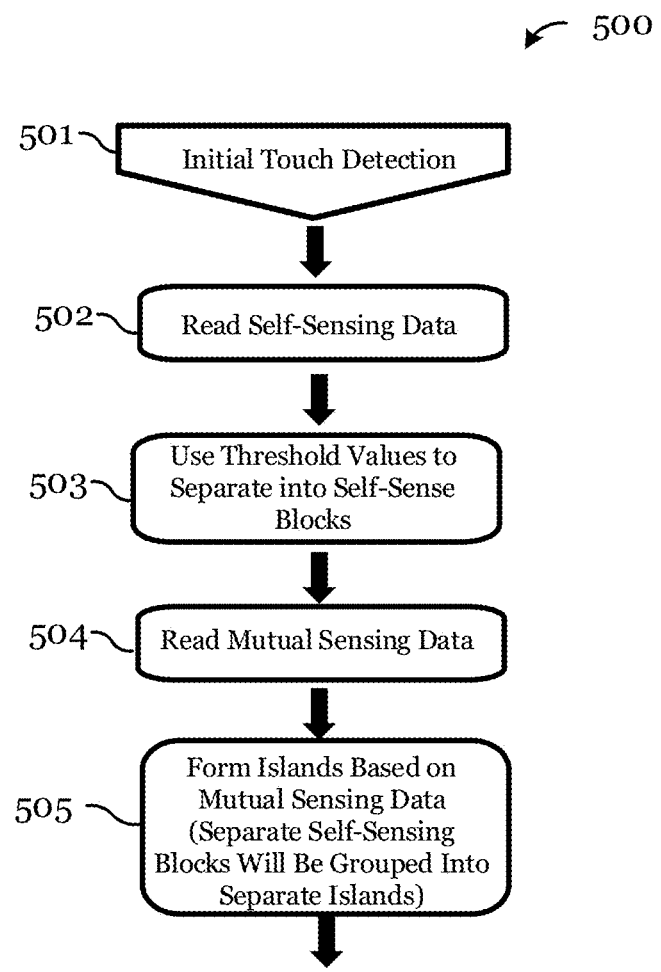
FIG. 4B illustrates an alternative process flow, as performed at the touch detector of FIG. 1C, to determine touch information based on mutual sensing data and self-sensing data in accordance with an embodiment of the present invention.

An electronic device for touch detection will be described using FIGS. 1A-1C. FIGS. 2A-2C and 3 will be used to describe a representative raw measurement data from a capacitive touch sensor. FIGS. 4A-4B will then be used to describe alternative method of implementing the features of the electronic device discussed in FIGS. 1A-1C. Representative results of the touch detection system will be discussed using FIGS. 5A-5D.

Figure 1B:
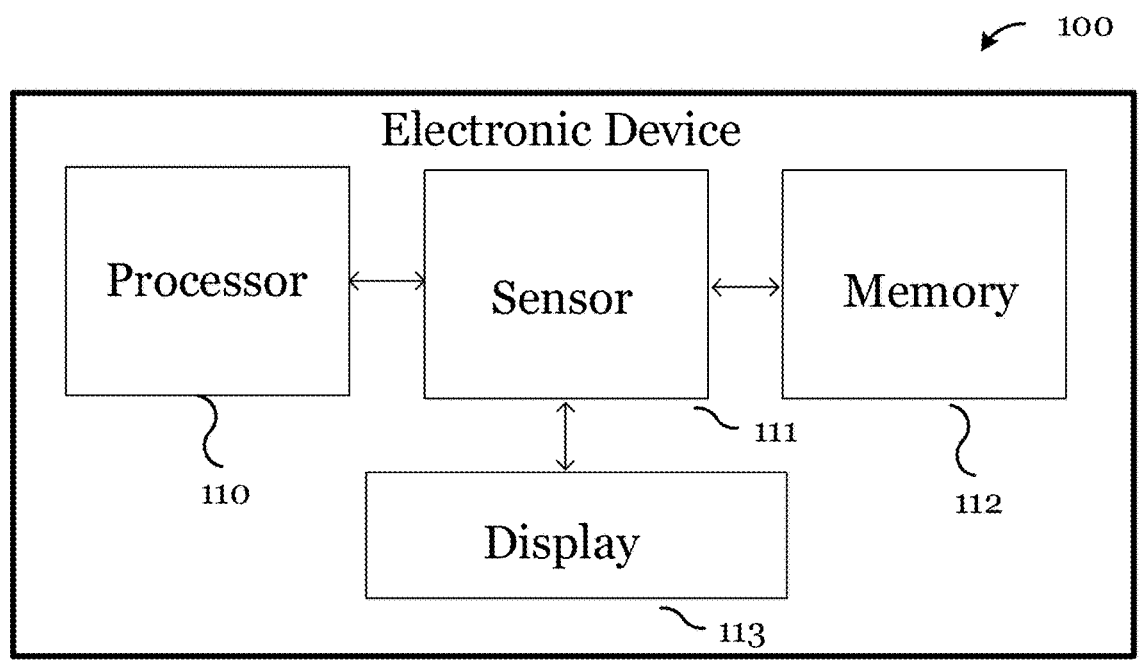
Figure 1C:
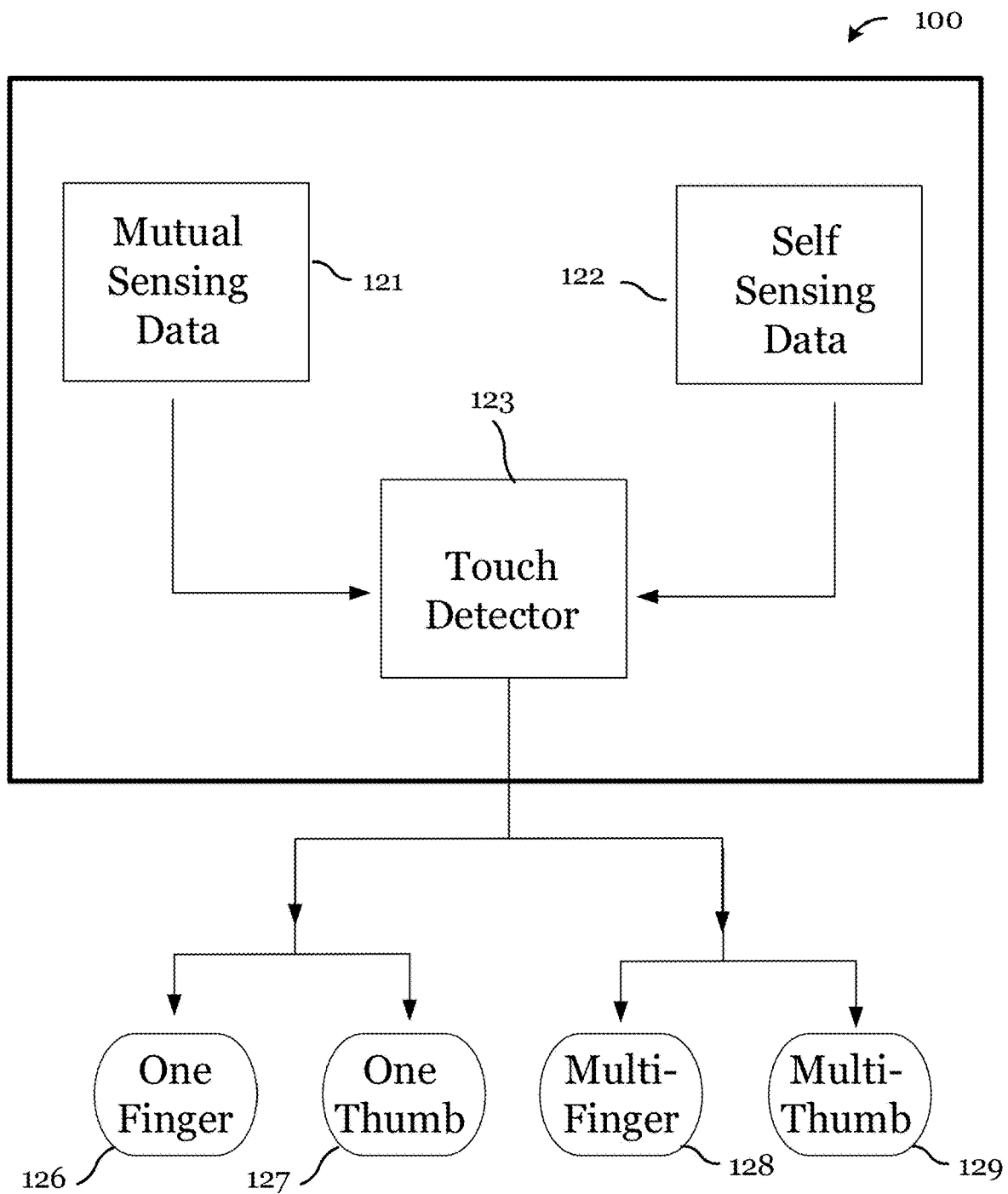

FIGS. 1A-C illustrate an electronic device 100 having a touch sensitive display that is configured to detect and differentiate various types of contact in accordance with an embodiment of the invention, where FIG. 1A illustrates a front view of the electronic device 100, FIG. 1B illustrates a component schematic of the electronic device 100, and FIG. 1C illustrates the process of detecting various types of contact.

FIG. 1A illustrates a schematic detailing an embodiment of a front face of the electronic device 100. The electronic device 100 comprises a housing structure 101 on which a touchscreen 102 is mounted. In embodiments of the electronic device 100, the housing structure 101 may further comprise auxiliary components (i.e., speakers, microphones, switches, etc.) that have been assembled into the housing structure 101 to provide various functionalities to the electronic device 100.

The touchscreen 102 comprises a plurality of sensors 103 that are arranged in a grid-like fashion. In some embodiments of the electronic device 100, a display 113 may be situated on the front facing side on the electronic device 100. The display 113 may comprise a light emitting diode (LED) display, organic LED display, liquid crystal display, or any other type of display.

In the illustration shown in FIG. 1A, the front display of the electronic device 100 is oriented so that the touchscreen 102 is placed in a landscape mode of operation. In other embodiments of the electronic device 100, the front display can be oriented so that the touchscreen 102 is placed in a portrait mode of operation.

Although the illustration of the electronic device 100 in FIG. 1A is similar to a mobile phone, in various embodiments, the electronic device 100 may include tablets, handheld gaming units, and others.

FIG. 1B illustrates that the electronic device 100 may include a processor 110, a sensor 111, a display 113, and a memory 112, which may be electronically coupled to each other through a bus.

The memory 112 may be programmed for short term and/or long term memory storage. The memory 112 may comprise various programs to be executed in the processor 110. The memory 112 may include both volatile and non-volatile memories. The memory 112 is designed to retain information generated by the processor 110 so it can be recalled at a later time.

The touchscreen 102 is designed to register user input via touches made to its surface. In other embodiments of the electronic device 100, input from the touchscreen 102 may also come from input given from a stylus device. In some embodiments, the display 113 and the touchscreen 102 may be integrated in one component or in other embodiments, they may be separate components. The sensor 111 may include the touchscreen 102 as well as other sensors such as gyroscopes, accelerometers, ambient light sensors, various photo sensors. One or more of the sensors may be integrated together.

The processor 110 analyzes information and carries out a series of executable scripts, e.g., stored in the memory 112, based on user input. The processor 110 may comprise an application-specific integrated circuit (ASIC) device, a system on chip (SOC), or any other processing unit known in the art. In various embodiments, the processor 110 may comprise a number of separate computing units such as cores integrated within one processor, or distinct separate processing chips. In other embodiments, some of the processing may be integrated with the sensor 111.

As will be described in detail further below, the processor 110 when executed analyzes groupings of touch values produced from a matrix of touch sensitive areas in the touchscreen 102. Information gathered from the sensor 111/touchscreen 102 is used to determine, even under poor grounding conditions, if the analyzed touch values define a single touch of a smaller finger such as index finger, tall finger, ring finger, little finger, or single touch of a large finger such as a thumb, simultaneous touch by two or more small fingers, or simultaneous touch by two large fingers. This is accomplished by identifying a touch pattern that best fits a designated touch profile representative of the finger.

To overcome issues relating to quality of data due to poor grounding conditions, embodiments as next described using FIG. 1C, analyze information generated from mutual sensing data 121 and self-sensing data 122. Mutual sensing data 121 measures a change in capacitance due to a change in a dielectric medium between adjacent ones of the plurality of sensors 103. Self-sensing data 122 measures a change in sensed capacitance at one of the plurality of sensor 103 regions being contacted. Self-sensing measurements can augment with additional information when the mutual sensing data is unreliable under poor grounding conditions. More information regarding the facets of mutual sensing and self-sensing will be described further below.

The information gathered from both data sets are used as input by the touch detector 123. The touch detector 123 applies a system of process steps (which are detailed below) to the received data in order to decipher the user input. After a detailed analysis, the touch detector 123 determines that the user input is generated by a single finger touch 126, a single thumb touch 127, multi-finger touch 128, or a multi-thumb touch 129.

In embodiments of the invention, the touch detector 123 may analyze a grouping of raw touch values produced from a matrix of finger touch sensitive areas to determine if the raw touch values define a valid touch pattern fitting a designated touch profile. For example, a touch pattern may comprise a set of raw touch values wherein a subset of those raw touch values may comprise regions of low strength (i.e., regions with a collective of independent touch values falling lower than a first predefined threshold value) surrounded by regions of high strength (i.e., regions with a collective of independent touch values falling higher than a second predefined threshold value). The touch profiles are then analyzed and validated by a system of process steps (which will be described in detail later) in efforts to interpret the user input with high accuracy (especially in poorly grounded conditions).

In various embodiments of the invention, the touch detector 123 may be a program that is stored in the memory 112 and executed in the processor 110 based on the inputs received at the sensor 111. For example, the touch detector 123 may comprise a program comprising instructions to execute the flow charts of FIG. 4A or 4B.

Representative measurement data will first be described using FIGS. 2 and 3 before discussing the flow charts that implement the touch detector 123.

Figure 2A:
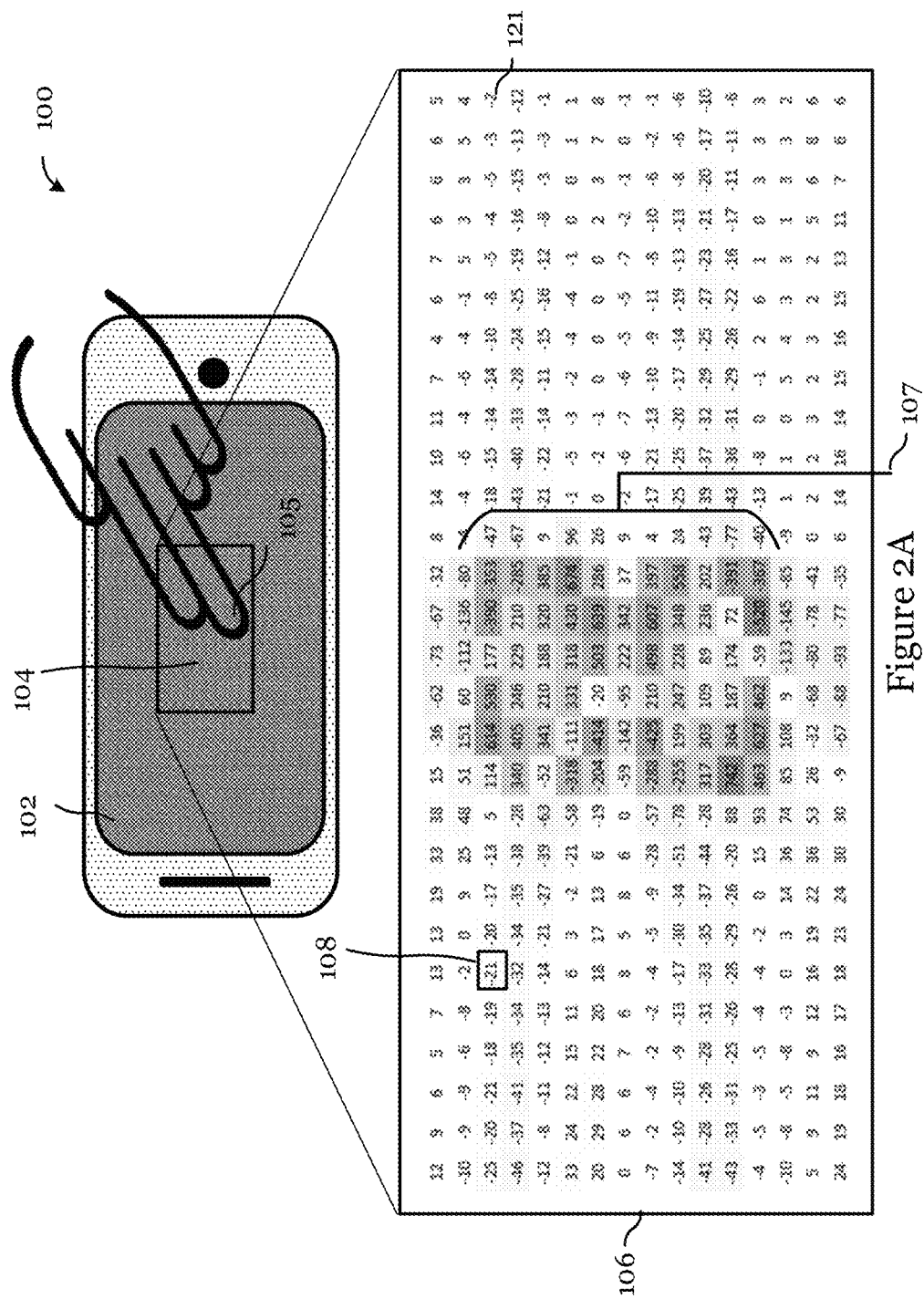
Figure 2B:
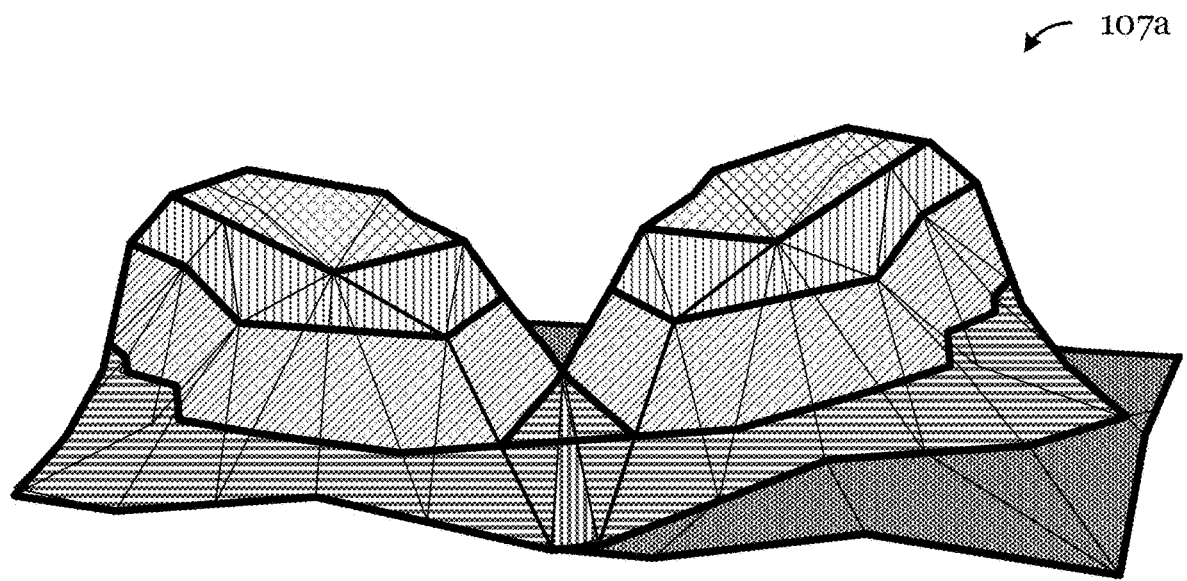
Figure 2C:
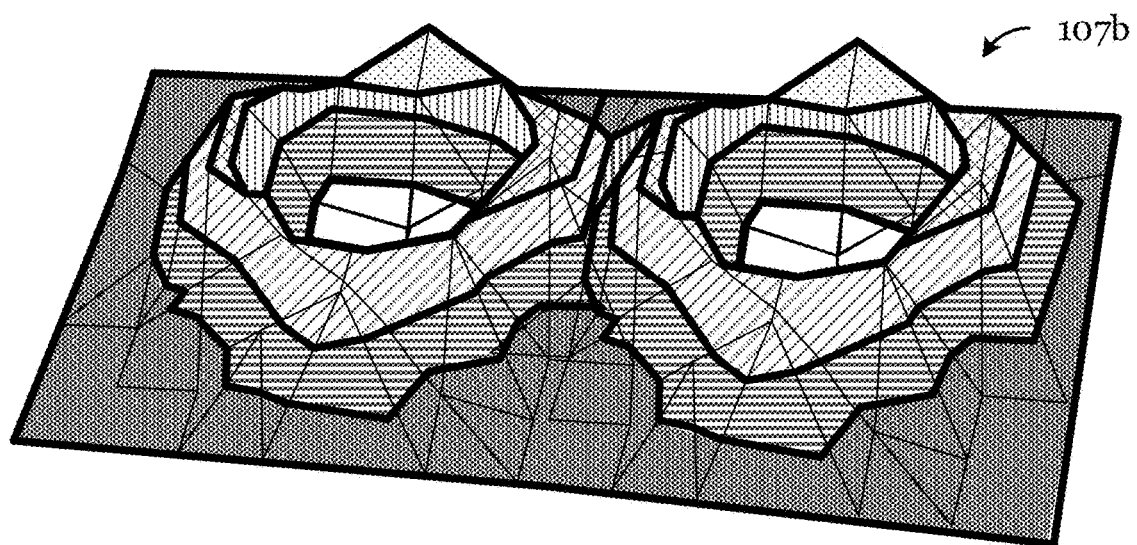

FIGS. 2A-C illustrates exemplary raw touch data detected by an electronic device, wherein FIG. 2A illustrates an exemplary electronic readout of raw touch data, wherein FIG. 2B represents a first exemplary raw touch data 107a obtained under well-grounded conditions, and wherein FIG. 2C represents a second exemplary raw touch data 107b obtained under poorly-grounded conditions.

FIG. 2A is a schematic showing an electronic device 100 after an initial touch has been received. The schematic shows the front facing display of an electronic device 100 while being operated in landscape mode. By the simultaneous placement of multiple fingers 105 (along the same vertical axis) on a touch sensitive region 104 within a touchscreen 102, the user has triggered a touch event.

As mentioned earlier, the touchscreen 102 is electrically coupled to a plurality of sensors 103 (as illustrated in FIG. 1A) that span the entirety of the touchscreen 102 in a grid-like fashion. Any of the individual sensors comprising the plurality of sensors 103 that are associated with the location of the user input, will produce a measurable change in electrical signal due to a change in capacitance. This measureable change in capacitance may be seen in the electronic readout 106 as a change in current drawn through the corresponding sensors. Accordingly, the electronic readout 106 shows a collection of all the raw touch values 108 from each of the plurality of sensors 103. The raw touch values 108 indicates a raw count and is proportional to the current drawn through the capacitive sensor due to the change in the capacitance and is therefore indicative of a touch (when a predefined threshold is met).

According to an embodiment of the invention, as described above, the raw touch values 108 pertain to capacitive-based information generated from each of the plurality of sensors 103. Utilizing the capacitive-based data (as shown within the electronic readout 106), information pertaining to the location (i.e., x- and y-coordinates) of the initial touch impression 107 can be obtained.

This type of scanned data displayed as in FIG. 2A along with its spatial component, e.g., by including the location of the measuring sensor, in the electronic readout 106 is the mutual sensing data 121. Thus, the mutual sensing data 121 includes a spatial/location component along with the raw data that is being measured.

The initial touch impression 107 can be influenced by the type of mode in which the electronic device 100 is being operated. In ideal modes of operation of the electronic device 100, the device may be plugged into a USB charger (charging port or station), and/or may be held within the hands. This mode of operation typically returns properly registered information.

FIG. 2B represents an illustration of a first three-dimensional rendering 107a of the initial touch impression 107 in well-grounded conditions of two simultaneous thumb impressions.

As the thumb is pressed onto the touch sensitive region 104 within a touchscreen 102, the regions that press against the touchscreen 102 exhibit a larger change in mutual capacitance as electric field lines going through the air between the adjacent sensors is replaced to pass through the finger. In this particular illustration, the shape of the initial touch impression 107 is well-formed, fitting an ideal touch profile. Thus, two separate and distinct mounds are visible in the mutual sensing data representative of the two thumb impressions. An algorithm can thus easily identify the user input correctly.

On the other hand, poorly-grounded conditions (i.e., not hand-held or not plugged into a USB charger), can result in improper and inaccurate reporting.

FIG. 2C represents an illustration of a second three-dimensional rendering 107b of the same initial touch impression 107 when measured in poorly-grounded conditions. The shape of the initial touch impression 107 has center regions where the shape appears more depressed or inset than its surrounding outer edges, in other words, has the shape of a volcanic crater. As is evident, a continuous rim having a higher strength surrounds a crater of a lower strength. The floor level of the crater may however be higher than the (noise) floor level outside the crater.

This may be happen due to various reasons. Generally, a ground plane is included in the device to reduce system level noise and improve signal integrity. However, a ground plane can cause parasitic capacitive effects during capacitive sensing because it provides for the termination of electric field lines thus introducing a parasitic capacitance. When the electronic device is connected, for example, to a USB power source, a shield plane may be introduced/powered that cuts off the parasitic capacitive effects of the ground plane. This additional parasitic capacitance results in poor quality data as for example illustrated in FIG. 2C, where there is a region of lower strength being entirely encircled by a region of higher strength, such that the region of higher strength encapsulates or forms a ring around the region of lower strength. With this type of touch profile (which will now be referred to as a volcanic crater profile or annular like profile from hereon) input can be misinterpreted during processing of the data, thus resulting in false readouts, poor returns, un-executed scripts, or false merging of data.

For example, when a user simultaneously touches the touchscreen 102 with two thumbs, due to poor grounding, the program may instead read this user input as coming from multiple little fingers. This improper touch identification may cause poor user experience by registering incorrect or unintended input.

Figure 3:
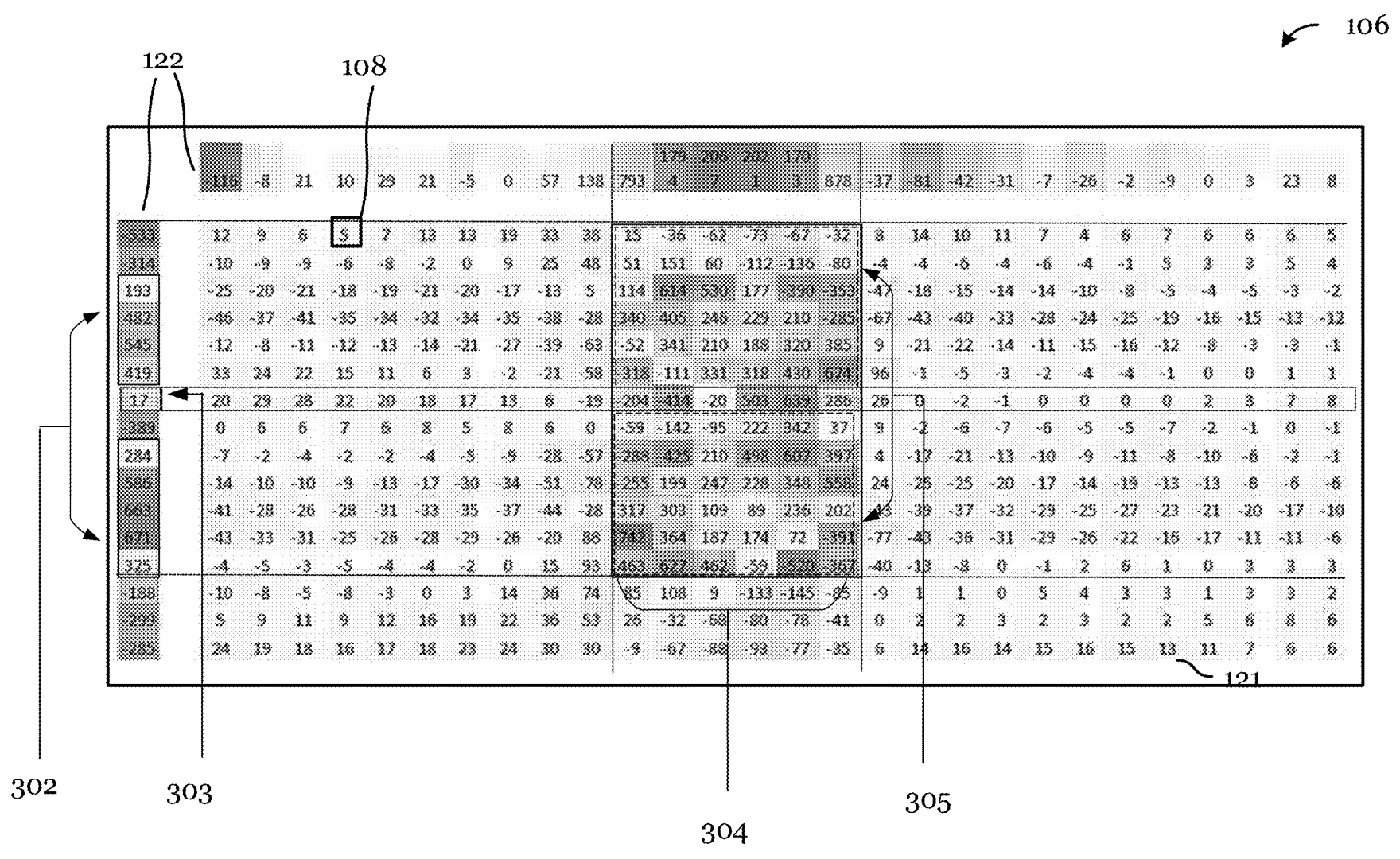

FIG. 3 illustrates an exemplary electronic readout of raw touch data detected by an electronic device that includes both mutual sensing data and self-sensing data showing formation of touch patterns in accordance with an embodiment of the present invention.

Referring to FIG. 3, the electronic readout 106 comprises the raw touch values 108; an initial touch island 304; the self-sensing data 122 comprising the self-sensing blocks 302 and the valley channels 303; and lastly, the final touch isles 305.

The raw touch values 108 within the electronic readout 106 are arranged in a matrix-like fashion. The exemplary illustration in the embodiment of the electronic readout 106 illustrated in FIG. 3 comprises a matrix defined by 16 rows and by 32 columns. During a mutual sensing operation, a controller such as the processor 110 (FIG. 1B) selects and drives a particular row (e.g., X0) and scans every column (e.g., Y0, Y1, Y2, . . . Yn) that intersects with the selected row to obtain a raw mutual capacitance value at each intersection of the selected row and column. In this manner, a matrix of mutual capacitance values is obtained for each intersecting node (i.e., X0Y0, X0Y1, X0Y2, . . . , X0Yn). A similar operation can be repeated for every row to obtain the full matrix of mutual capacitance values.

Accordingly each raw touch value 108 is spatially associated to an individual sensor comprised within the plurality of sensors 103. According to embodiments of the invention, the raw touch values 108 may comprise mutual capacitive data generated by the user input. Alternatively, the raw touch values 108 may comprise pressure sensing values. For example, when a user provides input to the touchscreen 102 of an electronic device boo, the sensors 111 coupled directly to the initial touch sensitive region 104 will detect the touch and provide a scan of the data associated with that initial touch sensitive region 104.

Within the electronic readout 106, the initial touch island 304 (shown by the larger box outlined by the dotted black line) comprises all the raw touch values 108 associated with the location of the user input.

According to embodiments of the electronic readout 106, the self-sensing data 122 is a different type of scan from the mutual sensing data 121. For example, the self-sensing data 122 is not arranged in a matrix-like fashion. Instead, the self-sensing data 122 only has a single vertical component comprising of a single column or a single horizontal component comprising of a single row. When a human finger is brought to contact the touchscreen of the electronic device, the human body capacitance changes the self-capacitance of the electrode. In other words, in self-sensing a selected row sensor is driven to an operating voltage. When a human finger is brought proximate to the selected row sensor, an additional capacitance is added resulting in a charge transfer and therefore a flow of current that can be detected. However, the exact location of the human finger cannot be determined using self-sensing other than determining that it is located on the selected row.

Therefore, as a practical matter, with self-sensing data 122, if the user inputs a single touch, the self-sensing data 122 can determine the position of the initial touch. However, if the user touches at multiple locations, it becomes difficult to determine the exact location of the touch. At the same time, self-sensing data is less susceptible to errors from poor grounding conditions. Therefore, in various embodiments, the matrix-like arrangement of the mutual sensing data 121 is used in tandem with the self-sensing data 122 to gather additional information about the initial touch and correct for artifacts introduced into the mutual sensing data.

As illustrated in FIG. 3, the self-sensing blocks 302 are areas within the self-sensing data 122 where peaks exist. The peaks are areas within the self-sensing data 122 where the raw touch values 108 are greater than a set threshold value. This is referred to as higher strength values. These peaks (higher strength values) make it easier to identify the quantity of touches (single touch or multi-touch) within the initial touch profile. Again, according to the orientation of the electronic device 100, the self-sensing blocks 302 can be present within self-sensing data 122 from the X-sensor (vertical column) or the Y-sensor (horizontal row).

As shown in FIG. 3, the valley channels 303 are comprised within the self-sensing data 122 and are located between the peaks and/or the self-sensing blocks 302. Once the valley channel 303 is identified in the self-sensing data 122, it can be mapped back to a location within the mutual sensing data 121 so the initial touch island 304 can be separated into smaller islands that are more representative of the user's actual touch input (i.e., single touch vs. multi-touch). Once all the mutual sending nodes corresponding to the valley channel 303 are removed, the final touch isles 305 (as shown by the dashed outlined boxes). For example, in FIG. 3, there are two final touch isles 305 present, which can now be analyzed to identify the initial user input. Otherwise, without the use of the self-sensing data, the user's two thumb input (e.g., FIG. 2C) would be improperly merged during analysis, and inaccurately determined to be from a single thumb, for example.

The general embodiment described above in FIG. 3 may be applied during user processing in different ways as will be described using FIGS. 4A-B.

FIG. 4A illustrates a process flow 400, as performed at the touch detector 123 of FIG. 1C, to determine touch information based on an analysis of the mutual sensing data and self-sensing data in accordance with an embodiment of the present invention.

In step 401, an initial touch from the user is detected from a touchscreen 102. The pressure applied on the touchscreen 102 from the initial touch is transduced into a usable signal that activates the system. In various embodiments, the touch detection in this step may also comprise other types of sensing.

Once the initial touch is detected, in the step 402, the mutual sensing data is read to obtain the mutual sensing data and determine the location of the initial touch. For example, the matrix comprising raw touch values of the mutual sensing data may be read into the memory of the electronic device as illustrated in FIG. 3 (raw touch values 108 of mutual sensing data 121).

Next, in step 403, one or more touch islands 304 are formed. Based upon a predefined threshold value, regions of high strength (higher capacitance change) and low strength (lower capacitance change) may be identified in the mutual sensing data 121. For example, as previously discussed with respect to FIG. 3, contiguous regions of high strength are grouped together to form touch islands 304. For example, contiguous regions having raw touch values higher than a predefined threshold may be grouped into each touch island 304.

As previously discussed, the touch imprint may be caused by a touch under ideal grounding condition or under poor grounding condition. If the touch is under an ideal (or near ideal) grounding condition, the touch islands 304 likely have a distinctive mound like shape with a substantially centrally located peak value. On the other hand, when the touch was made under poor grounding condition, the touch islands 304 may comprise annular/ring or volcanic crater like shape as discussed before.

In a specific example as illustrated in FIG. 3, the touch island 304 has a volcanic crater like touch pattern that can be expressed as a designated touch profile (i.e., volcanic crater profile which comprises a region of lower strength completely or substantially encircled by a region of higher strength).

Therefore, in step 404, a determination is made whether a distinctive touch profile is present within each touch island 304. In particular, each touch island 304 is analyzed to determine whether a poor-grounding condition was present when the touch impression occurred. As was previously described above using FIG. 2C, a poor-grounding condition causes a volcanic crater profile.

In determining the presence or absence of the volcanic crater profile, the mutual sensing data may be bracketed into several strength regions based on the raw touch data. For example, a crater threshold may be used to determine whether the crater floor is higher than the (noise) floor threshold. Similarly a rim threshold, higher than the crater threshold, may be used to determine the presence or absence of the volcanic rim. In various embodiments, the threshold values may be static values used to set a defined limit governing which regions will be deemed as fitting a higher strength region or a lower strength region. In other embodiments, the threshold values may be dynamic values that can be configured based on a desired application or product use case. For example, some embodiments of the invention may use a rim threshold value set at 100 (arbitrary units) in order to achieve optimal performance of an electronic device 100. Therefore, any raw touch value that is higher than 100 will be deemed a higher strength value. Likewise, any raw touch value that is between a range, for example, higher than 50 but lower than 100 will be deemed a lower strength value. Furthermore, the groupings of these higher strength and lower strength regions form touch patterns which may be characteristic of a particular touch profile.

If the volcanic crater profile is not present, in step 406, the mutual sensing data is representative of the actual impression and therefore can be analyzed to determine whether it was from a single finger or multiple fingers. This is because as previously discussed using FIG. 2B, in this case, the quality of the mutual sensing data is reliable and therefore can be directly used to determine the user imprint. Accordingly, in the step 410, the program identifies that a single finger touch was made and the location of the single finger touch on the touchscreen determines the desired user input. Likewise, if it is found the initial input originated from multiple finger touches, in the step 409, the program identifies that a multi-finger touch was made.

On the other hand, if poor-grounding condition causes the occurrence of a volcanic crater profile, then as illustrated in step 405, self-sensing data is read to improve the data. This is because unlike mutual sensing data that is susceptible to ground plane effects, self-sensing data is more reliable under poor-grounding conditions.

If the self-sensing data shows multiple groupings, for example, as illustrated in FIG. 3 with self-sensing blocks 302 separated by valley channels 303, then a determination may be made that the touch islands 304 may need to be further sub divided into touch isles 305 as in FIG. 3. This is because the separation of the self-sensing data into distinct self-sensing blocks 302 suggests multiple contact regions. In various embodiments, depending on the orientation of the electronic device only the row or column self-sensing data is read and used in the analysis.

For doing this determination, in step 405, the program analyses whether any touch island 304 falls within a row (or column) of valley channels 303. Any touch island 304 passing through a valley channel 303 is divided into touch isles 305 (e.g., see description above using FIG. 3) as illustrated in step 407. In other words, no touch island 304 is allowed to be shared between adjacent self-sensing blocks 302. If the touch island 304 does not pass through (or intersect with) a valley channel 303, then the touch island 304 is not divided further (further flow follows step 408 as discussed below).

In step 411, each touch isle 305 thus created is checked again to determine whether it comprises a volcanic crater profile (ring or annular like shape). If the touch isle 305 comprises the volcanic crater profile, it is determined that the touch isle 305 contains a thumb impression (step 414). This step 411 may include a further validation process prior to making a final determination. In contrast to the prior determination step 404, the validation process may scrutinize the data more thoroughly to distinguish between single thumb impression and multiple finger impressions. Accordingly, the validation process may 100k at the relative values of the raw data to determine whether the touch isle 305 comprises a properly formed volcanic crater shaped region. For example, a crater threshold may be used to determine whether the crater floor is higher than the (noise) floor threshold. A rim threshold, higher than the crater threshold, may be used to determine whether the rim forms a continuous (unbroken) rim that contiguously surrounds the crater floor without leaving a gap. As an example, the rim threshold may be at least ten times the noise floor and may be at least 1.5 times (greater by 50% of) the crater floor. Once the volcanic crater is validated, the touch isle 305 is determined to include a thumb impression, the location of the thumb being centered on the volcanic crater.

On the other hand, if the touch isle 305 does not comprise the volcanic crater profile, it is determined that the touch isle 305 contains an impression of multiple little fingers (step 412). This step 412 may include a finger separation algorithm to determine the location and optionally type of finger for each of the multiple little fingers.

In step 408, similarly for each touch island 304, it is determined that the touch island 304 contains a thumb impression or multiple little fingers based on performing a validation process of the volcanic crater profile (similar to the touch isle validation discussed above). If the volcanic crater profile validation is successful, the touch island 304 is deemed to include a thumb impression (box 413) and in contrast if the volcanic crater profile validation is unsuccessful, the touch island 304 is deemed to include multiple finger touches (box 412).

FIG. 4B illustrates an alternative process flow 500, as performed at the touch detector 123 of FIG. 1C, to determine touch information based on an analysis of the mutual sensing data and self-sensing data in accordance with an embodiment of the present invention. This embodiment is similar to the prior embodiment except in the order in which mutual sensing data and self-sensing data are read and applied. Unlike the prior embodiment, which started from reading mutual sensing data, in this embodiment, a preliminary data screening is performed using self-sensing data.

In step 501, as in the prior embodiment, an initial touch from the user is detected from a touchscreen 102. Once the initial touch is detected, in the next step 502, self-sensing data 122 is read. Depending on the orientation of the touchscreen either the row or column self-sensing data 122 is read. Next, in the step 503, a predefined threshold value is used to separate the self-sensing data 122 into self-sensing blocks 302 (see FIG. 3). As previously discussed, the self-sensing blocks 302 are separated by valley channels 303.

In the following step 504, the mutual sensing data 121 is read. If mutual sensing data 121 does not exist or current, a measurement is performed to obtain this data. In step 505, touch isles 305 are formed by grouping contiguous regions of the mutual sensing data 121 having a raw data count higher than a particular predefined threshold value as discussed in prior embodiments. However, in this embodiment, separate self-sensing blocks 302 are grouped into separate touch isles 305. In other words, as in prior embodiments, valley channels 303 do not intersect or pass through the touch isles 305.

The touch isles 305 thus generated are similar to the touch isles 305 discussed previously and therefore subsequent processing is not described in detail. Accordingly, each touch isle 305 is analyzed to determine if they include a volcanic crater profile. If the touch isle 305 does not include a volcanic crater profile, the touch isle 305 includes either a single finger touch or multiple finger touches, which can be ascertained using a finger separation algorithm. On the other hand, if the touch isle 305 does include a volcanic crater profile, which is validated, then the touch isle 305 includes a thumb impression.

Advantages of various embodiments described herein may include a method used to reliably detect user input from the touchscreen 102 of an electronic device 100, especially under poor return conditions.

FIGS. 5A-5D illustrate examples of processing the touch data using the process flow in accordance with embodiment of the invention described above using, e.g., FIG. 4A or FIG. 4B.

In the examples of FIGS. 5A-D, an outer shaded region 511 represents a mutual sensing value higher than a first predefined threshold and an inner shaded region 512 represents a mutual sensing value between the first predefined threshold but higher than a second predefined threshold, and noise floor level region 513 that is lower than the second predefined threshold. In the illustration, the self-sensing data 122 comprises two self-sense blocks 302.

Figure 5A:
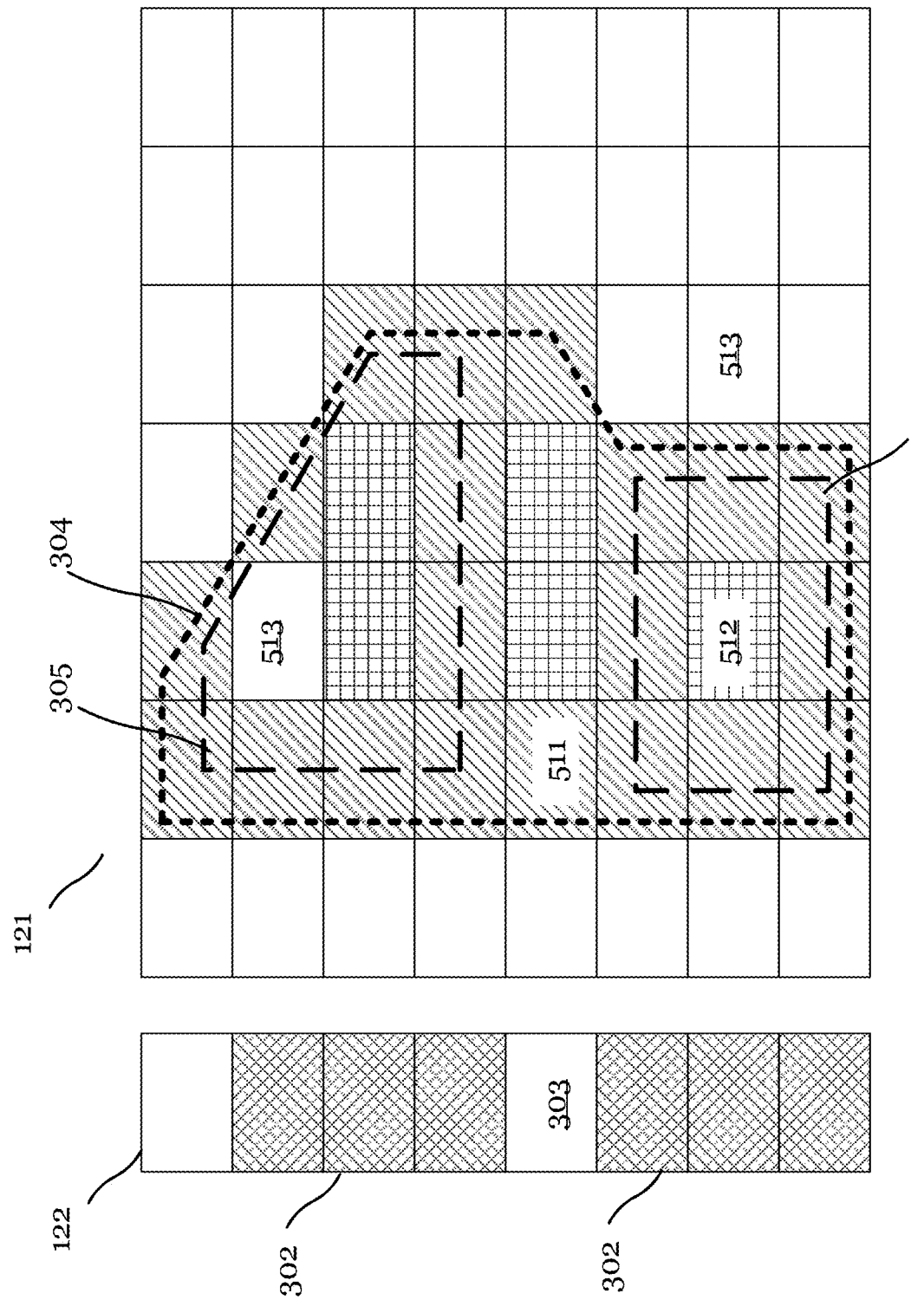
FIGS. 5A-5D illustrate examples of processing the touch data using the process flow in accordance with embodiment of the invention described above using, e.g., FIG. 4A or FIG. 4B.

In FIG. 5A, a touch island 304 is identified, e.g., in step 404 of FIG. 4A. However, subsequently because of the valley channel 303 separating the two self-sense blocks 302, the touch island 304 is divided into two separate touch isles 305. In forming the touch island 304, regions that are diametrically adjacent (sharing a vertex) may be considered to be contiguous although in other embodiments only regions that share a side are considered to be contiguous. Each of the touch isles 305 is separately analyzed as discussed onwards from step 407. As both the touch isles 305 have a volcanic crater profile, the validation process generates two separate thumb impressions.

Figure 5B:
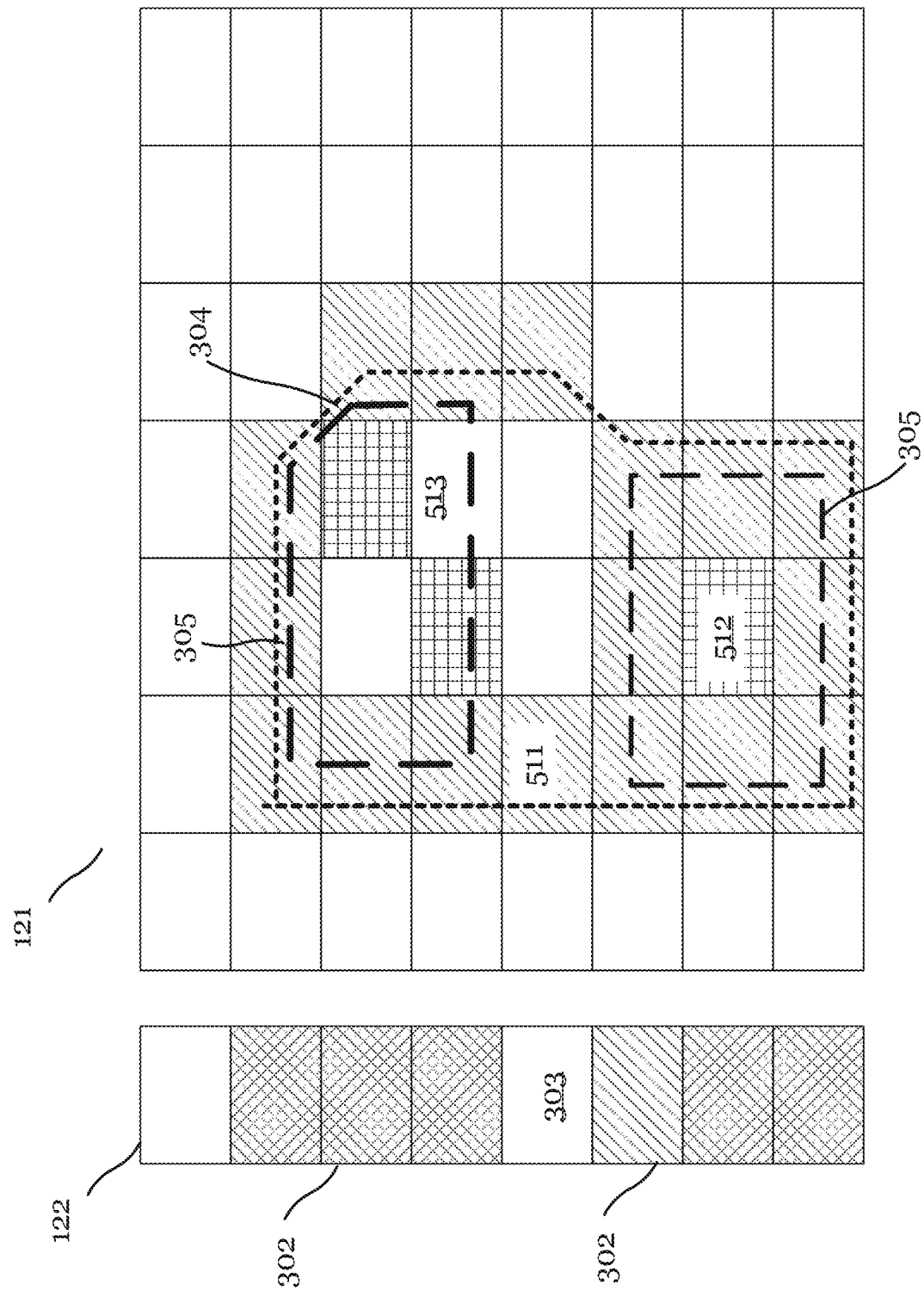

In contrast, in FIG. 5B, although a touch island 304 is created in step 404 as in the prior embodiment, and two separate touch isles 305 are generated, the subsequent use of self-sensing data breaks apart the volcanic crater profile in the upper portion. Accordingly, during validation, only the bottom portion of the initial touch island 304 is found to have made contact by a thumb. In the upper portion of the touch island 404, the rim of the volcanic crater (e.g., outer shaded region 511) does not full enclose the crater (e.g., inner shaded region 512).

Figure 5C:
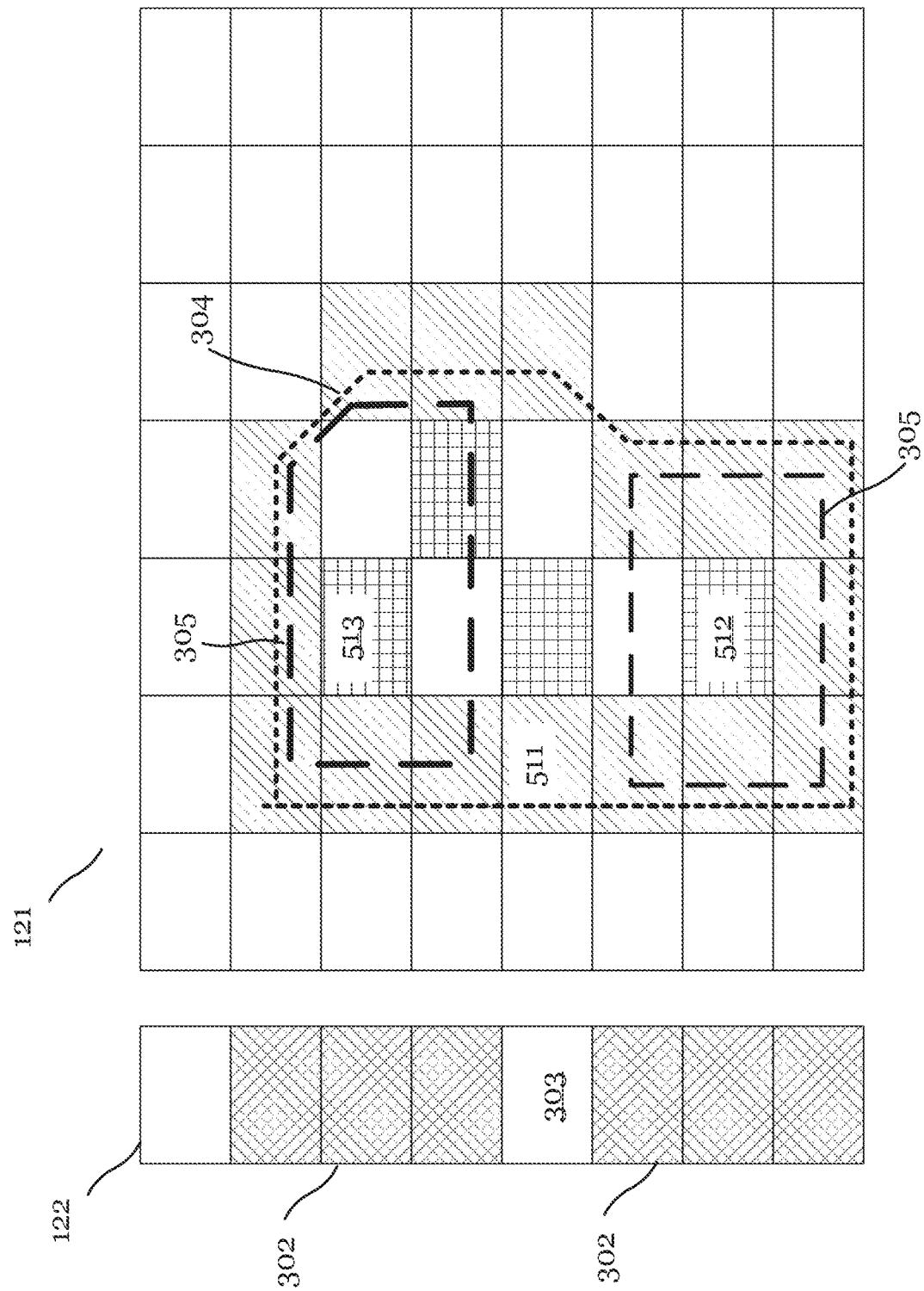

In FIG. 5C, after applying the self-sense data 122, none of the individual touch isles 305 include a volcanic crater profile. Therefore, in this case, the program determines that multiple fingers contacted the touch screen and not a thumb. A finger separation algorithm can then be used to determine the exact locations and number of fingers.

Figure 5D:
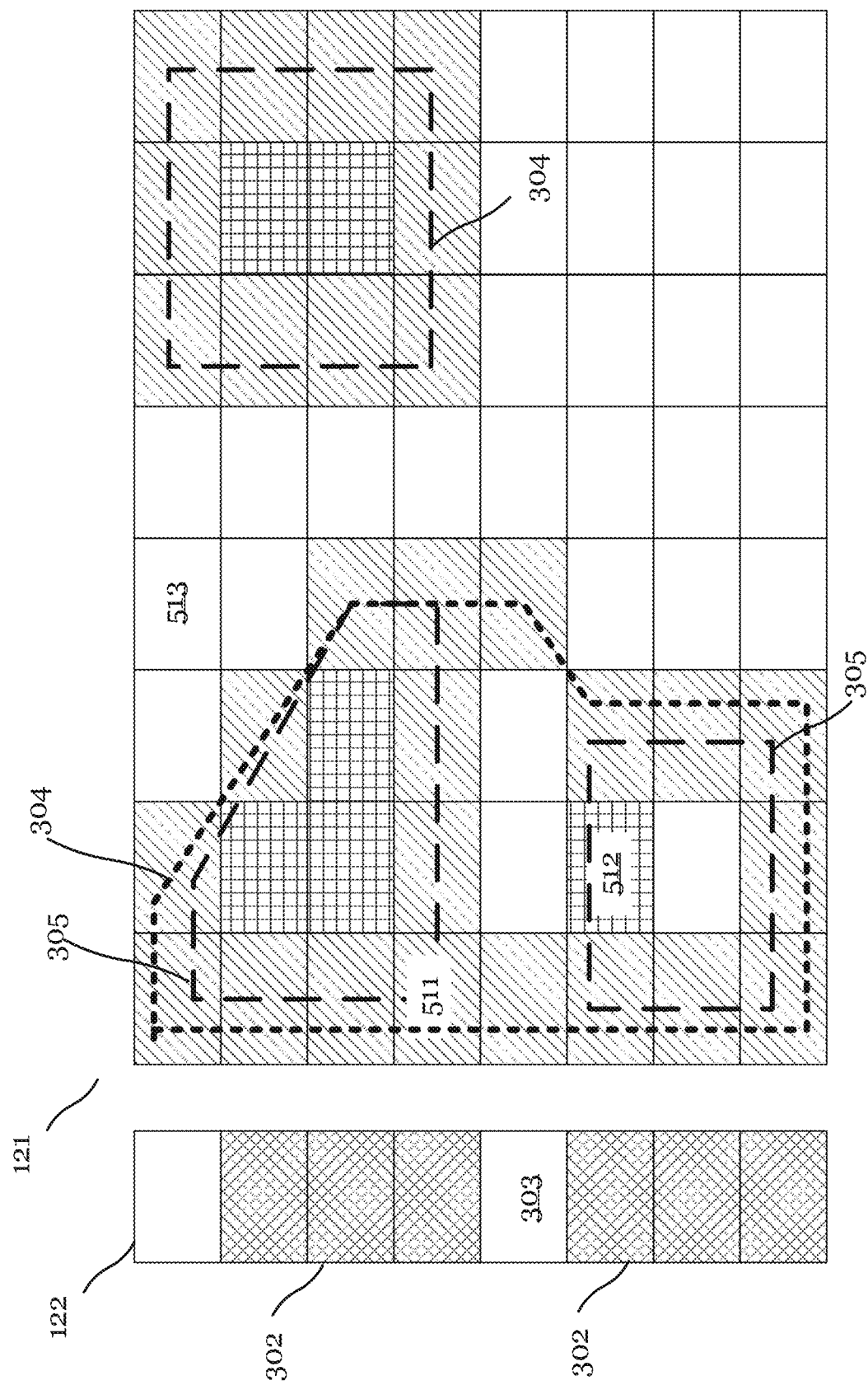

In FIG. 5D, only the top touch isle 305 includes a volcanic crater profile whereas the bottom touch isle 305 includes a multi-finger contact as the rim of the volcanic crater (e.g., outer shaded region 511) does not full enclose the crater (e.g., inner shaded region 512). Similarly, the right side of the mutual sensing data 121 includes a further touch island 304 that was not subdivided by the self-sensing data 121 and is therefore found to be a thumb contact after validation that it includes a volcanic crater profile.

Example embodiments of the invention are summarized here. Other embodiments can also be understood from the entirety of the specification as well as the claims filed herein.

Example 1. A method for operating an electronic device comprises determining that a touch sensitive display is being contacted. The touch sensitive display comprises a plurality of mutual-sensing capacitive sensor regions and an array of self-sensing capacitive sensor regions. The plurality of mutual-sensing capacitive sensor regions is arranged in rows and columns on the touch sensitive display. The array of self-sensing capacitive sensor regions is arranged in a row or a column on the touch sensitive display. The method may include reading mutual sensing data measured by the plurality of mutual-sensing capacitive sensor regions to obtain mutual sensing touch values for each of the rows and the columns. The method also includes reading self-sensing data measured by the array of self-sensing capacitive sensor regions to obtain self-sensing touch values for the row or the column. Based on the mutual sensing touch values and self-sensing touch values, the method includes determining whether a contacted region of the touch sensitive display is an impression of a single finger, multiple fingers, a single thumb, or multiple thumbs.

Example 2. The method of example 1, where reading the mutual sensing data includes measuring a change in capacitance between adjacent ones of the plurality of mutual-sensing capacitive sensors; and where reading the self-sensing data includes measuring a change in sensed capacitance at one of the array of self-sensing capacitive sensor regions.

Example 3. The method of one of examples 1 or 2, further including: forming a touch island based on the mutual sensing touch values; determining that the touch island includes a volcanic crater profile; determining whether the self-sensing touch values includes a plurality of self-sensing blocks; in response to determining that the self-sensing touch values includes the plurality of self-sensing blocks, dividing the touch island into touch isles, where each one of the touch isles being associated with one of the plurality of self-sensing blocks; and based on the mutual sensing touch values, determining whether each of the touch isles includes an impression of the multiple fingers or of the single thumb.

Example 4. The method of one of examples 1 to 3, where determining whether each of the touch isles includes the impression of the multiple fingers or of the single thumb includes: determining whether each of the touch isles includes the volcanic crater profile; and in response to determining that one of the touch isles includes the volcanic crater profile, determining that the impression is of the single thumb for that one of the touch isles.

Example 5. The method of one of examples 1 to 4, where determining whether each of the touch isles includes the impression of the multiple fingers or of the single thumb includes: determining whether each of the touch isles includes the volcanic crater profile; and in response to determining that one of the touch isles does not include the volcanic crater profile, determining that the impression is of the multiple fingers for that one of the touch isles.

Example 6. The method of one of examples 1 to 5, further including: forming a touch island based on the mutual sensing touch values; determining that the touch island includes a volcanic crater profile; determining whether the self-sensing touch values includes a plurality of self-sensing blocks; in response to determining that the self-sensing touch values does not include the plurality of self-sensing blocks, determining that the touch island does not include multiple touch isles; and determining from the mutual sensing touch values in the touch island whether the impression is of the multiple fingers or of the single thumb.

Example 7. The method of one of examples 1 to 6, where the determining includes: forming a touch island based on the mutual sensing touch values; and determining that the touch island does not include a volcanic crater profile.

Example 8. The method of one of examples 1 to 7, further including: in response to determining that the touch island does not include the volcanic crater profile, determining that the touch island includes an impression of a single finger.

Example 9. The method of one of examples 1 to 8, further including: in response to determining that the touch island does not include the volcanic crater profile, determining that the touch island includes an impression of multiple fingers.

Example 10: A method for operating an electronic device, the method comprises determining that a touch sensitive display is being contacted. The touch sensitive display comprises a plurality of sensor regions and an array of self-sensing capacitive sensor regions. The plurality of sensor regions is arranged in rows and columns on the touch sensitive display. The array of self-sensing capacitive sensor regions is arranged in a row or a column on the touch sensitive display. The method further includes reading mutual sensing data to obtain mutual sensing touch values for each of the plurality of sensor regions. The method may further include based on the mutual sensing touch values, identifying a subset of the plurality of sensor regions comprising contiguous sensor regions. Each of the contiguous sensor regions of the subset has a mutual sensing touch value higher than a first threshold value. The method may further include determining whether any of the sensor regions of the subset have a mutual sensing touch value less than the first threshold value and greater than a second threshold value. The method may further include identifying a first region when it is determined that the subset includes one sensor region having a mutual sensing touch value less than the first threshold value and greater than the second threshold value, and the one sensor region is enclosed within the remaining ones of the subset of the plurality of sensor regions. In response to identifying the first region, the method may include reading self-sensing data to obtain self-sensing touch values, determining whether the self-sensing data comprises a plurality of self-sense blocks, dividing the first region into a plurality of second regions in response to determining that the self-sensing data comprises the plurality of self-sense blocks, wherein each of the plurality of second regions corresponds to one of the plurality of self-sense blocks. For each of the plurality of second regions, the method may include determining whether it comprises a volcanic crater profile that is indicative of an impression of a thumb.

Example 11. The method of example 10, where reading the mutual sensing data includes measuring a change in capacitance between adjacent ones of the plurality of mutual-sensing capacitive sensors; and where reading the self-sensing data includes measuring a change in sensed capacitance at one row of the array of self-sensing capacitive sensor regions.

Example 12. The method of one of examples 10 or 11, where in response to determining that one of the plurality of second regions includes the volcanic crater profile, determining a contact by the thumb.

Example 13. The method of one of examples 10 to 12, where for each of the plurality of second regions that does not include a volcanic crater profile, performing a finger separation algorithm to determine a location of contact on the touch sensitive display.

Example 14. The method of one of examples 10 to 13, where the first threshold value is greater than a noise floor value by at least 10 times, where the first threshold value is greater than the second threshold value by at least 50%.

Example 15: An electronic device comprises a touch sensitive display comprising a plurality of capacitive sensor regions. The plurality of capacitive sensor regions is arranged in rows and columns on the touch sensitive display. The plurality of capacitive sensor regions is configured to measure mutual capacitance and generate mutual sensing touch values for each row and column and measure self-sensing capacitance and generate self-sensing touch values for each row or column. The electronic device comprises a processor, and a memory storing a program to be executed in the processor. The program comprises instructions for determining that the touch sensitive display is being contacted, reading the mutual sensing touch values for each row and column, reading the self-sensing touch values for each row or each column. Based on the mutual sensing touch values and self-sensing touch values, the program may comprise instructions for determining whether a contacted region of the touch sensitive display is an impression of a single finger, multiple fingers, a single thumb, or multiple thumbs.

Example 16. The device of example 15, where the instructions for reading the mutual sensing data includes instructions for measuring a change in capacitance between adjacent ones of the plurality of mutual-sensing capacitive sensors; and where the instructions for reading the self-sensing data includes instructions for measuring a change in sensed capacitance at one of the array of self-sensing capacitive sensor regions.

Example 17. The device of one of examples 15 or 16, where the program includes further instructions for: forming a touch island based on the mutual sensing touch values; determining that the touch island includes a volcanic crater profile; determining whether the self-sensing touch values includes a plurality of self-sensing blocks; in response to determining that the self-sensing touch values includes the plurality of self-sensing blocks, dividing the touch island into touch isles, where each one of the touch isles being associated with one of the plurality of self-sensing blocks; and based on the mutual sensing touch values, determining whether each of the touch isles includes an impression of the multiple fingers or of the single thumb.

[moo] Example 18. The device of one of examples 15 to 17, where the instructions for determining whether each of the touch isles includes the impression of the multiple fingers or of the single thumb includes instructions for: determining whether each of the touch isles includes the volcanic crater profile; and in response to determining that one of the touch isles includes the volcanic crater profile, determining that the impression is of the single thumb for that one of the touch isles.

[owl] Example 19. The device of one of examples 15 to 18, where the instructions for determining whether each of the touch isles includes the impression of the multiple fingers or of the single thumb includes instructions for: determining whether each of the touch isles includes the volcanic crater profile; and in response to determining that one of the touch isles does not include the volcanic crater profile, determining that the impression is of the multiple fingers for that one of the touch isles.

Example 20. The device of one of examples 15 to 19, where the program includes further instructions for: forming a touch island based on the mutual sensing touch values; determining that the touch island includes a volcanic crater profile; determining whether the self-sensing touch values includes a plurality of self-sensing blocks; in response to determining that the self-sensing touch values does not include the plurality of self-sensing blocks, determining that the touch island does not include multiple touch isles; and determining from the mutual sensing touch values in the touch island whether the impression is of the multiple fingers or of the single thumb.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for operating an electronic device, the method comprising:
    determining that a touch sensitive display is being contacted, the touch sensitive display comprising a plurality of mutual-sensing capacitive sensor regions and an array of self-sensing capacitive sensor regions, the plurality of mutual-sensing capacitive sensor regions being arranged in rows and columns on the touch sensitive display, the array of self-sensing capacitive sensor regions arranged in a row or a column on the touch sensitive display;
    reading mutual sensing data measured by the plurality of mutual-sensing capacitive sensor regions to obtain mutual sensing touch values for each of the rows and the columns;
    reading self-sensing data measured by the array of self-sensing capacitive sensor regions to obtain self-sensing touch values for the row or the column; and
    based on the mutual sensing touch values and self-sensing touch values, determining whether a contacted region of the touch sensitive display is an impression of a single finger, multiple fingers, a single thumb, or multiple thumbs by
        determining whether the self-sensing touch values comprises a plurality of self-sensing blocks,
        in response to determining that the self-sensing touch values comprises the plurality of self-sensing blocks, dividing a touch island based on the mutual sensing touch values into touch isles, wherein each one of the touch isles being associated with one of the plurality of self-sensing blocks, and
        based on the mutual sensing touch values, determining whether each of the touch isles comprises an impression of the multiple fingers or of the single thumb.

2. The method of claim 1, wherein reading the mutual sensing data comprises measuring a change in capacitance between adjacent ones of the plurality of mutual-sensing capacitive sensors; and wherein reading the self-sensing data comprises measuring a change in sensed capacitance at one of the array of self-sensing capacitive sensor regions.

3. The method of claim 1, further comprising:
    forming the touch island based on the mutual sensing touch values; and
    determining that the touch island comprises a volcanic crater profile.

4. The method of claim 3, wherein determining whether each of the touch isles comprises the impression of the multiple fingers or of the single thumb comprises:
    determining whether each of the touch isles comprises the volcanic crater profile; and
    in response to determining that one of the touch isles comprises the volcanic crater profile, determining that the impression is of the single thumb for that one of the touch isles.

5. The method of claim 3, wherein determining whether each of the touch isles comprises the impression of the multiple fingers or of the single thumb comprises:
    determining whether each of the touch isles comprises the volcanic crater profile; and
    in response to determining that one of the touch isles does not comprise the volcanic crater profile, determining that the impression is of the multiple fingers for that one of the touch isles.

6. The method of claim 1, further comprising:
forming a touch island based on the mutual sensing touch values;
determining that the touch island comprises a volcanic crater profile;
determining whether the self-sensing touch values comprises a plurality of self-sensing blocks;
in response to determining that the self-sensing touch values does not comprise the plurality of self-sensing blocks, determining that the touch island does not comprise multiple touch isles; and
determining from the mutual sensing touch values in the touch island whether the impression is of the multiple fingers or of the single thumb.

7. The method of claim 1, wherein the determining comprises:
forming a touch island based on the mutual sensing touch values; and
determining that the touch island does not comprise a volcanic crater profile.

8. The method of claim 7, further comprising:
in response to determining that the touch island does not comprise the volcanic crater profile, determining that the touch island comprises an impression of a single finger.

9. The method of claim 7, further comprising:
in response to determining that the touch island does not comprise the volcanic crater profile, determining that the touch island comprises an impression of multiple fingers.

10. A method for operating an electronic device, the method comprising:
determining that a touch sensitive display is being contacted, the touch sensitive display comprising a plurality of sensor regions and an array of self-sensing capacitive sensor regions, the plurality of sensor regions being arranged in rows and columns on the touch sensitive display, the array of self-sensing capacitive sensor regions being arranged in a row or a column on the touch sensitive display;
reading mutual sensing data to obtain mutual sensing touch values for each of the plurality of sensor regions;
based on the mutual sensing touch values, identifying a subset of the plurality of sensor regions comprising contiguous sensor regions, each of the contiguous sensor regions of the subset having a mutual sensing touch value higher than a first threshold value;
determining whether any of the sensor regions of the subset have a mutual sensing touch value less than the first threshold value and greater than a second threshold value;
identifying a first region when it is determined that
the subset includes one sensor region having a mutual sensing touch value less than the first threshold value and greater than the second threshold value, and
the one sensor region is enclosed within the remaining ones of the subset of the plurality of sensor regions; and
in response to identifying the first region,
reading self-sensing data to obtain self-sensing touch values,
determining whether the self-sensing data comprises a plurality of self-sense blocks,
dividing the first region into a plurality of second regions in response to determining that the self-sensing data comprises the plurality of self-sense blocks, wherein each of the plurality of second regions corresponds to one of the plurality of self-sense blocks, and
for each of the plurality of second regions, determining whether it comprises a volcanic crater profile that is indicative of an impression of a thumb.

11. The method of claim 10, wherein reading the mutual sensing data comprises measuring a change in capacitance between adjacent ones of the plurality of sensor regions; and wherein reading the self-sensing data comprises measuring a change in sensed capacitance at one row of the array of self-sensing capacitive sensor regions.

12. The method of claim 10, wherein in response to determining that one of the plurality of second regions comprises the volcanic crater profile, determining a contact by the thumb.

13. The method of claim 10, wherein for each of the plurality of second regions that does not comprise a volcanic crater profile, performing a finger separation algorithm to determine a location of contact on the touch sensitive display.

14. The method of claim 10, wherein the first threshold value is greater than a noise floor value by at least 10 times, wherein the first threshold value is greater than the second threshold value by at least 50%.

15. An electronic device comprising:
a touch sensitive display comprising a plurality of capacitive sensor regions, the plurality of capacitive sensor regions being arranged in rows and columns on the touch sensitive display, the plurality of capacitive sensor regions configured to measure mutual capacitance and generate mutual sensing touch values for each row and column and measure self-sensing capacitance and generate self-sensing touch values for each row or column;
a processor;
a memory storing a program to be executed in the processor, the program comprising instructions for
determining that the touch sensitive display is being contacted,
reading the mutual sensing touch values for each row and column;
reading the self-sensing touch values for each row or each column; and
based on the mutual sensing touch values and self-sensing touch values, determining whether a contacted region of the touch sensitive display is an impression of a single finger, multiple fingers, a single thumb, or multiple thumbs by
determining whether the self-sensing touch values comprises a plurality of self-sensing blocks,
in response to determining that the self-sensing touch values comprises the plurality of self-sensing blocks, dividing a touch island based on the mutual sensing touch values into touch isles, wherein each one of the touch isles being associated with one of the plurality of self-sensing blocks, and
based on the mutual sensing touch values, determining whether each of the touch isles comprises an impression of the multiple fingers or of the single thumb.

16. The device of claim 15, wherein the instructions for reading the mutual sensing touch values comprises instructions for measuring a change in capacitance between adjacent ones of the plurality of capacitive sensor regions; and wherein the instructions for reading the self-sensing touch values comprises instructions for measuring a change in sensed capacitance at one of the plurality of capacitive sensor regions.

17. The device of claim 15, wherein the program comprises further instructions for:
   forming the touch island based on the mutual sensing touch values; and
   determining that the touch island comprises a volcanic crater profile.

18. The device of claim 17, wherein the instructions for determining whether each of the touch isles comprises the impression of the multiple fingers or of the single thumb comprises instructions for:
   determining whether each of the touch isles comprises the volcanic crater profile; and
   in response to determining that one of the touch isles comprises the volcanic crater profile, determining that the impression is of the single thumb for that one of the touch isles.

19. The device of claim 17, wherein the instructions for determining whether each of the touch isles comprises the impression of the multiple fingers or of the single thumb comprises instructions for:
   determining whether each of the touch isles comprises the volcanic crater profile; and
   in response to determining that one of the touch isles does not comprise the volcanic crater profile, determining that the impression is of the multiple fingers for that one of the touch isles.

20. The device of claim 15, wherein the program comprises further instructions for:
   forming a touch island based on the mutual sensing touch values;
   determining that the touch island comprises a volcanic crater profile;
   determining whether the self-sensing touch values comprises a plurality of self-sensing blocks;
   in response to determining that the self-sensing touch values does not comprise the plurality of self-sensing blocks, determining that the touch island does not comprise multiple touch isles; and
   determining from the mutual sensing touch values in the touch island whether the impression is of the multiple fingers or of the single thumb.

21. A method for operating an electronic device, the method comprising:
   determining that a touch sensitive display is being contacted, the touch sensitive display comprising a plurality of mutual-sensing capacitive sensor regions and an array of self-sensing capacitive sensor regions, the plurality of mutual-sensing capacitive sensor regions being arranged in rows and columns on the touch sensitive display, the array of self-sensing capacitive sensor regions arranged in a row or a column on the touch sensitive display;
   reading mutual sensing data measured by the plurality of mutual-sensing capacitive sensor regions to obtain mutual sensing touch values for each of the rows and the columns;
   reading self-sensing data measured by the array of self-sensing capacitive sensor regions to obtain self-sensing touch values for the row or the column; and
   based on the mutual sensing touch values and self-sensing touch values, determining that a contacted region of the touch sensitive display is an impression of two thumbs and not a single thumb.

22. The method of claim 21, wherein determining that a contacted region of the touch sensitive display is an impression of two thumbs and not a single thumb comprises:
   identifying a touch island based on the mutual sensing touch values;
   dividing the touch island into two separate touch isles based on the self-sensing touch values; and
   determining that each of the two separate touch isles is a distinct thumb impression.

23. The method of claim 22, wherein determining that each of the two separate touch isles is a distinct thumb impression comprises identifying a volcanic crater profile in each of the two separate touch isles.

* * * * *